United States Patent
Dhere et al.

(10) Patent No.: US 12,473,379 B2
(45) Date of Patent: Nov. 18, 2025

(54) METHOD FOR OBTAINING PURIFIED BACTERIAL POLYSACCHARIDES

(71) Applicant: SERUM INSTITUTE OF INDIA PRIVATE LIMITED, Maharashtra (IN)

(72) Inventors: Rajeev Mhalasakant Dhere, Maharashtra (IN); Swapan Kumar Jana, Maharashtra (IN); Walmik Karbhari Gaikwad, Maharashtra (IN)

(73) Assignee: Serum Institute of India Private Limited, Pune Maharashtra (IN)

( * ) Notice: Subject to any disclaimer, the term of this patent is extended or adjusted under 35 U.S.C. 154(b) by 384 days.

(21) Appl. No.: 17/010,084

(22) Filed: Sep. 2, 2020

(65) Prior Publication Data

US 2021/0070890 A1  Mar. 11, 2021

(30) Foreign Application Priority Data

Sep. 6, 2019  (IN)  ............... 201921036006

(51) Int. Cl.
| | | |
|---|---|---|
| C08B 37/00 | (2006.01) | |
| B01D 15/32 | (2006.01) | |
| B01D 21/26 | (2006.01) | |
| C12P 1/04 | (2006.01) | |
| A61K 39/00 | (2006.01) | |

(52) U.S. Cl.
CPC ........ C08B 37/0003 (2013.01); B01D 15/327 (2013.01); B01D 21/262 (2013.01); C12P 1/04 (2013.01); A61K 39/00 (2013.01)

(58) Field of Classification Search
None
See application file for complete search history.

(56) References Cited

U.S. PATENT DOCUMENTS

| | | | |
|---|---|---|---|
| 5,714,354 A | 2/1998 | Arnold et al. | |
| 5,747,663 A | 5/1998 | Colpan et al. | |
| 5,847,112 A * | 12/1998 | Kniskern | C12P 19/04 536/123 |
| 5,907,688 A * | 5/1999 | Hauck | G06F 13/364 710/107 |
| 6,428,703 B1 | 8/2002 | Zinn et al. | |
| 7,491,517 B2 | 2/2009 | Reddy | |
| 9,176,140 B2 * | 11/2015 | Asefa | B81C 99/0095 |
| 9,249,439 B2 | 2/2016 | Vinayak et al. | |
| 10,729,780 B2 | 8/2020 | Dhere et al. | |
| 11,191,822 B2 * | 12/2021 | Seeberger | A61P 31/04 |
| 11,229,660 B2 * | 1/2022 | von Maltzahn | A61K 31/165 |
| 2009/0010959 A1 | 1/2009 | Biemans et al. | |

FOREIGN PATENT DOCUMENTS

| | | |
|---|---|---|
| EP | 3 085 711 A1 | 10/2016 |
| WO | 2008/129559 A2 | 10/2008 |
| WO | 2011/051917 A1 | 5/2011 |
| WO | 2011/133191 A1 | 10/2011 |
| WO | 2011/145108 A2 | 11/2011 |
| WO | 2013/046226 A2 | 4/2013 |
| WO | 2014/009971 A2 | 1/2014 |
| WO | 2015/128798 A1 | 9/2015 |
| WO | 2017/006349 A1 | 1/2017 |
| WO | WO-2018106845 A1 * | 6/2018 ........... A61K 31/715 |

OTHER PUBLICATIONS

Kumar et al. (Enzyme & Microbial Technology, 34 (2004), pp. 673-681).*
Seung-Jin et al. ( J. Microbiol. Biotechnol. (2011) 21 97), pp. 734-738).*
Massaldi et al. (Biotech. Appl. Biochem., 2010,(55), p. 37-43).*
Wang et al. (Int'l J. of Bio. Macromol., 244 (2023) 125360, pp. 1-12).*

* cited by examiner

*Primary Examiner* — Hope A Robinson
(74) *Attorney, Agent, or Firm* — BakerHostetler

(57) ABSTRACT

The present disclosure relates to a method for obtaining purified bacterial polysaccharides. The method comprises simultaneous removal of impurities as well as sizing of bacterial polysaccharides using an acid instead of conventional mechanical sizing methods. The method is simple, rapid and cost effective. The method results in high polysaccharide recovery and low impurity content. The purified polysaccharide obtained by the method of the present disclosure may be used for large scale production of polysaccharide-protein conjugate vaccines.

23 Claims, 7 Drawing Sheets

METHOD FOR OBTAINING PURIFIED BACTERIAL POLYSACCHARIDES

CROSS-REFERENCE TO RELATED APPLICATIONS

This application claims priority to foreign Indian patent application No. IN 201921036006, filed on Sep. 6, 2019, the disclosure of which is incorporated by reference in its entirety.

FIELD

The present disclosure relates to method for obtaining purified bacterial polysaccharides.

BACKGROUND

Polysaccharides represent essential, although highly structurally diverse, components on microbial cell surfaces. They are the primary interface with the host and play critical roles in survival strategies. Acting as shields against environmental assaults, they are actively investigated as attractive vaccine components. Polysaccharides represent prime components on bacterial cell surfaces. Produced by both pathogenic and non-pathogenic bacteria, often play critical roles in host-bacterium interactions. Occurring in the form of capsular polysaccharides (CPS), lipooligosaccharides (LOS), or lipopolysaccharides (LPS), they are important virulence factors contributing to, among other processes, surface charge, phase variation, resistance to serum-mediated killing, and more generally modulation of the host immune response. Whereas CPS may be present in both Gram-positive and Gram-negative bacteria, LPS is restricted to the outer membrane of the latter. LPS consists of three structural parts: the lipid A that serves as an anchor into the membrane, a core oligosaccharide (OS), and an O-specific polysaccharide (O-SP), which is the most surface-exposed and structurally diverse constituent [Carbohydrate Chemistry: Chemical and Biological Approaches Volume 43; Laurence A. Mulard, 2018].

There are a number of vaccines being developed against infectious diseases caused by bacteria, such as *Neisseria meningitidis*, *Salmonella* spp., *Streptococcus pneumoniae*, and *Haemophilus* influenza.

Pneumococcal infections can lead to serious invasive diseases such as meningitis, septicaemia and pneumonia, as well as milder but more common illnesses such as sinusitis and otitis media. There are >90 known serotypes of *S. pneumoniae*. The distribution of serotypes that cause disease varies over time and by age, disease syndrome, disease severity, geographical region and the presence of antimicrobial resistant genes. Of the estimated 5.83 million deaths among children <5 years of age globally in 2015, 294 000 (uncertainty range [UR], 192 000-366 000) were estimated to be caused by pneumococcal infections. Before the introduction of pneumococcal conjugate vaccines (PCVs) in the different WHO regions, 6-11 serotypes accounted for ≥70% of all invasive pneumococcal disease (IPD). The reported mean annual incidence of IPD in children aged <2 years was 44.4/100 000 per year in Europe and 167/100 000 per year in the United States of America. In comparison, the annual incidence of IPD in children <2 years in Africa ranged from 60/100 000 in South Africa to 797/100 000 in Mozambique. On average, about 75% of cases of IPD and 83% of cases of pneumococcal meningitis occur in children aged <2 years, but the incidence and age distribution of cases may vary by country, study method and socioeconomic status within countries. Case fatality rates from IPD in children can be high, ranging up to 20% for septicaemia and 50% for meningitis in low and middle income countries (LMICs).

The available 23-valent polysaccharide vaccine (23-PPV) is not effective in children less than 2 years of age, while the 7-valent conjugate vaccines (7-PCV) is effective in children, but has limited serotype coverage. To increase the serotype coverage, 10-valent conjugate vaccine containing the conjugates of the capsular polysaccharides from *S. pneumoniae* type 1, 4, 5, 6B, 7F, 9V, 14, 18C, 19F and 23F and protein D (a non-typeable *Haemophilus influenzae* protein), tetanus toxoid and diphtheria toxoid protein, and 13-valent conjugate vaccine containing the conjugates of capsular polysaccharides from *S. pneumoniae* type 1, 3, 4, 5, 6A, 6B, 7F, 9V, 14, 18C, 19A, 19F, and 23F and CRM197 protein have been licensed for use. Recent studies show that *S. pneumoniae* type 2, a serotype not covered by the currently commercially available vaccines, has emerged in the SAARC (The South Asian Association for Regional Cooperation) countries. *S. pneumoniae* type 2 is responsible for 4.54% of invasive pneumococcal disease in children in Nepal and 8.9% of invasive pneumococcal disease in children in Bangladesh (hospital based study) [Distribution of Serotypes, Vaccine Coverage, and Antimicrobial Susceptibility Pattern of *Streptococcus Pneumoniae* in Children Living in SAARC Countries: A Systematic Review Jaiswal, N. et al. PLOS ONE 2014, 9]. Further population based studies on pneumococcal serotype distribution attest that *S. pneumoniae* type 2 is the most prevalent serotype in Bangladesh causing 12.2% of invasive pneumococcal diseases [Current Trend in Pneumococcal Serotype Distribution in Asia, Le C. et al. J Vaccines Vaccine 2011]. Hence, there is a high need to provide a vaccine protecting against *S. pneumoniae* type 2, a serotype not covered by the currently commercialized vaccines.

PNEUMOSIL® is manufactured by the Applicant at commercial scale for *Streptococcus pneumoniae* serotypes 1, 5, 6B, 9V, 14, 19A, 19F, 23F, 7F and 6A; with all the serotypes conjugated to CRM197 as the carrier protein. The 10-valent pneumococcal conjugate vaccine covers over 70% of invasive pneumococcal-disease causing serotypes.

Capsular polysaccharides (CPS) are the primary cause of the virulence of these bacteria, and are often used in production of vaccines against these pathogens. Capsular polysaccharides can be used as such or may be coupled to a carrier protein (glycoconjugate).

Glycoconjugate vaccines are highly effective vaccines exhibiting T-dependent immune responses. A T-cell dependent protein carrier conjugated to the polysaccharide leads to the construction of a glycoconjugate. There is large body of evidence in the literature defining the immunogenic aspects of polysaccharide conjugate vaccines but details explaining the technical know-how for production and purification of the capsular polysaccharides are limited. The production of purified polysaccharide of desired quality is one of the key pre-requisite for effective conjugation with the carrier protein. The cost for cultivation and the purification of polysaccharides is generally high and involves a series of production and purification steps. [S. Sharma et al./Biologicals 43 (2015) 383e389]. Furthermore, the purified *Streptococcus pneumoniae* polysaccharide is required to meet the desired specifications e.g. as per WHO-TRS/BP/EP/IP wherein the protein and nucleic acid impurity content should be from 2 to 7.5% (w/w; dry basis) depending on the serotypes and 2% (w/w, dry basis), respectively.

The *Streptococcus pneumoniae* polysaccharide utilized for preparing conjugate vaccines are always associated with a substantial amount of a common impurity/contaminant, called C-Polysaccharide (CWPs). The CWPs content could compromise the efficacy of a pneumococcal conjugate vaccine. The CWPs has also been classified as a polysaccharide impurity by WHO, refer WHO TRS 19-23 Oct. 2009 (Recommendations to assure the quality, safety and efficacy of pneumococcal conjugate vaccines).

Various methods are known for the extraction and purification of polysaccharides for use in vaccine manufacturing. The downstream processing of biological preparations is root cause for 20%-80% of the total production costs (Ansejo and Patrick, 1990), the development of new downstream strategies is essential to reduce the production cost and allow the distribution of the vaccine for the entire population by the public health system.

Traditionally, bacterial polysaccharide purification is performed by extractions, using solvents such as ethanol and phenol to remove nucleic acids and protein, followed by ethanol precipitation and centrifugation to remove endotoxins. One of the earliest methods for isolation of *Neisseria meningitidis* polysaccharide from serogroup A, B and C involved use of cationic detergent Cetavlon to precipitate the negatively charged polysaccharides from the whole culture, followed by the dissociation of detergent-polysaccharide complex using $CaCl_2$) extraction and centrifugation, ethanol precipitation is used for nucleic acid removal whereas the proteins are removed using treatment of polysaccharides with sodium acetate followed by homogenization with chloroform-containing butanol [Gotschlich et al: J Exp Med. 1969 Jun. 1;129 (6): 1349-65]. Alternatively, use of hot phenol-water mixture is also reported. Final purification method involved polysaccharide precipitation with ethanol (4-5 times) and acetone. [T.P. Pato, Master's thesis, Instituto de Quimica, Universidade Federal do Rio de Janeiro, Rio de Janeiro, 2003, p. 95.]. However, these methods are multistep processes resulting in substantially low polysaccharide recovery. Further, these methods involve use of chloroform, phenol and large amount of ethanol. Use of chemicals like phenol can lead to unwanted structural changes in the polysaccharide or protein carrier and also result in undesirable toxic phenolic waste. In addition, handling and recycling of the toxic solvents and other components constitute safety and environmental risks.

In another method for purification of *Neisseria meningitidis* C polysaccharide, phenol extraction is substituted with proteinase digestion using mixture of proteinase K, nagarse and trypsin; Tangential ultrafiltration in hollow fibre 100 KDa cut-off instead of ultracentrifugation; followed by extensive diafiltration, using a 100 kDa cut-off membrane, performed in 20 mM Tris-HCl buffer containing 0.5% of deoxycholate, to eliminate low molecular weight proteins and lypopolysaccharides (LPS). Despite the use of above modifications, the isolated polysaccharide preparation contained protein and nucleic acid values 2% (w/w) and 1.5% (w/w), respectively. [Tanizaki et al: Journal of Microbiological Methods Volume 27, Issue 1, September 1996, Pages 19-23 & Goncalves et al 2007: Formatex; Communicating Current Research and Educational Topics and Trends in Applied Microbiology].

A modified purification process for *Neisseria meningitidis* C polysaccharide discloses a continuous flow centrifugation of the culture for removal of the cells; supernatant concentration by tangential filtration (100 kDa cut-off); addition of DOC, heating to 55° C. and tangential filtration (100 kDa cutoff); anion exchange chromatography (Source 15Q) and size exclusion chromatography (Sepharose CL-4B) [T.P. Pato et al./J. Chromatogr. B 832 (2006) 262-267].

U.S. Pat. No. 5,714,354 discloses an alcohol-free process for obtaining purified pneumococcal polysaccharides. The method comprises lysing the cells with deoxycholate, ultrafiltration, precipitating using cetrimonium bromide, ion exchange chromatography and hydroxy apatite chromatography.

U.S. Pat. No. 5,747,663 relates to a process for reduction or removal of endotoxin from biotechnologically derived therapeutic compositions involving incubation with non-ionic detergent prior to chromatographic purification. The chromatographic medium is anion exchange material and the chromatographic purification involves use of sodium chloride salt for washing.

U.S. Pat. No. 6,428,703 discloses a process for reduction or removal of endotoxin from biological macromolecules. The process involves treatment with non-ionic detergent without incubation period prior to the chromatographic purification. The chromatographic medium is anion exchange material and the anion exchanger retains the macromolecules and the purified macromolecule is eluted from the exchanger.

U.S. Pat. No. 7,491,517 discloses use of CTAB, ethanol, proteinase K, activated carbon and gel filtration for removal of impurities during purification of *Neisseria meningitidis* C polysaccharide. However, this multistep process results in polysaccharide recovery loss and further the use of activated carbon may give rise to undesirable leachables.

WO2008129559 discloses a process wherein fermentation broth is subjected to concentration and diafiltration followed by ammonium sulphate precipitation and centrifugation. This is followed by benzonase treatment, hydroxyapatite chromatography and diafiltration in sequence.

WO2011145108 discloses removal of protein contaminants from polysaccharides using sodium deoxycholate (DOC) and chromatography steps, wherein the protein impurities are precipitated without precipitating capsular polysaccharides.

WO2011133191 discloses a single-step purification process comprising a chromatographic step involving contacting the target substance to a chromatography matrix, washing bound target with a buffer containing a combination of a lyotropic agent or an organic solvent, a detergent and a salt component, desorbing bound target from chromatography matrix with an eluent and collecting the desorbed target substance.

WO2011051917 discloses a method for releasing capsular polysaccharide from *Staphylococcus aureus* type 5 or type 8 cells, comprising the step of treating the cells with acid. However, the process disclosed in WO2011051917 includes several labour intensive, time consuming and expensive downstream processing steps, such as enzymatic treatment, e.g. to remove nucleic acid, protein and/or peptidoglycan contaminants; diafiltration, e.g. to remove low molecular weight contaminants; anion exchange chromatography, e.g. to remove residual protein; and concentration.

WO2017006349 discloses use of zinc acetate/ammonium sulphate/sodium citrate for removal of protein contaminants from the *N. meningitidis* harvested extract. It also discloses use of enzymes like benzonase, proteinase K or nagarse for degradation of residual proteins and/or nucleic acid materials, followed by chromatographic purification. WO2015128798 discloses a process for removing impurities from *Neisseria meningitidis* C polysaccharide, which involves incubation at 50-60° C. in presence of anionic detergents like sodium deoxycholate or HEPES, deacetylation of crude polysaccharides using 0.5-1.5 M NaOH at 50° C., and further purification by diafiltration and Hydrophobic Interaction Chromatography (HIC).

Use of non-ionic detergent, such as TRITON™-X100/114 for purification of bacterial polysaccharides is also known (EP3085711, WO2014009971). However, TRITON™ persists in the extraction phase and elimination requires additional extensive washing steps to remove all the residues.

Another process for purification of *Neisseria meningitidis* C, W and Y serogroup polysaccharides comprises use of CTAB, Ethanol, DOC, Capto Adhere {multimodal anion exchange chromatography}, Capto DEAE (Weak anion) and Sephadex G25, wherein endotoxin content is less than 25 EU/mg, Protein content less than 10 mg/g, nucleic acid content between 1-7 mg/g [Tian et al: 2013 G E Healthcare; Application note, 29216880 AA].

Though, the above mentioned methods result in removal of protein and nucleic acid contaminations from the polysaccharides, there are several drawbacks associated with these methods. While the use of enzymes help in degradation of proteins and nucleic acid contaminants, the removal of enzymes and hydrolyzed material is tedious and may result in loss of the product of interest. Further efficiency and consistency of enzymes depends upon stability of the enzyme at different environmental conditions such as pH, temperature and duration. Furthermore, regulatory agencies have restricted the use of animal enzymes in products for humans because of the risk of contamination with prions. The use of enzymes will introduce more regulatory issues in the cGMP framework, such as the origins of enzymes (from animal or recombinant), and enzyme activity variations between different vendors and lots. Also utilization of such enzymes incurs significant costs as part of commercial scale operations.

Use of ammonium sulphate precipitates protein and nucleic acid contaminants. However, at times it also precipitates capsular polysaccharides, resulting in loss of total polysaccharide.

Sodium deoxycholate (DOC) is a mild detergent and is one of the most commonly used detergents in polysaccharide purifications. Sodium deoxycholate with a core steroidal structure is less denaturing and limited in its solubilising strength, it breaks the endotoxins without affecting the chemical structure; and hence upon removal of sodium deoxycholate, endotoxins regain their biological activity. Also, DOC based procedures do not work efficiently for removal of contaminants from polysaccharides, especially sialic acid containing polysaccharides. This could be due to weak detergent activity of DOC on lipopolysaccharide-protein association formed during the downstream processing, resulting in high level of endotoxins and protein content in the final isolated polysaccharide. Also reagents, such as phenol release intracellular contaminants into the extracellular media. As a consequence, additional purification steps are required to eliminate these contaminants, which increase the complexity of the process, decreasing the final yields and increasing the economic costs.

CTAB has been utilized for selective precipitation of polysaccharide, however CTAB is a hazardous chemical. Further ethanol is required for removal of CTAB from precipitated pneumococcal polysaccharides. Use of ethanol during pneumococcal polysaccharide purification is associated with following operational problems: a) use of ethanol requires a flame proof facility, b) designing such facility is very costly, c) ethanol is under custom/Government Regulation, d) ethanol is hazardous, e) effluent treatment is very difficult, f) large amount of ethanol is required and g) requires costly charcoal filtration and lyophilization steps. Also, ethanol is capable of precipitating the impurities as well as the polysaccharide, resulting in loss of polysaccharide of interest.

Chromatographic techniques like Size Exclusion Chromatography (SEC), Ion Exchange Chromatography (IEC), and Hydrophobic Interaction Chromatography (HIC) have been successfully used for isolation of bacterial polysaccharides with effective removal of protein and nucleic acid contaminants. Use of chromatographic techniques involves multistep labour and time consuming sample preparation, involves scalability issues, drastically compromises the recovery of the capsular polysaccharides and thus is not a feasible low cost option for industrial scale downstream processing. Further, chromatographic techniques, such as Size Exclusion Chromatography (SEC), do not provide an accurate representation of the High Molecular Weight (HMW) forms present in a sample due to filtration or non-specific binding of the HMW forms by the column.

It is known that depolymerised/sized polysaccharides have following advantages over plain polysaccharides when used to prepare the conjugates: (a) the conjugates prepared from using depolymerized polysaccharides may be inherently more immunogenic than the corresponding conjugates prepared from full length polysaccharides; and (b) reactions used to prepare these conjugate vaccines can offer a higher degree of control, as well as more versatility in process design, when using depolymerized polysaccharide chains versus full length polysaccharide chains.

It is necessary to reduce the molecular mass of the polysaccharide prior to the coupling reaction in order to perform end-group conjugation with high yields.

However previously reported sizing methods are associated with following shortcomings 1) provide polysaccharide material showing high polydispersity, 2) result in alteration/damage of epitopic confirmation of "polysaccharide antigen" which ultimately could result in low immunogenicity for polysaccharide-protein conjugate vaccine, and 3) are not reproducible i.e. show significant variations.

Several methods of partial depolymerization of bacterial polysaccharides are described which yield fragments suitable for conjugation, such as acid hydrolysis, alkaline degradation, oxidation by periodate, ozonolysis (Wang et al. Carb. Res. 1999, 319, 1-4,141-147), enzymatic hydrolysis, sonication (Pawlowski et al. Vaccine, 2000, 18.18, 1873-1885), electron beam fragmentation (Pawlowski et al. Micro Lett, 1999, 174.2, 255-263) U.S. Pat. No. 5,847,112 discloses a process for making capsular polysaccharides from *Streptococcus pneumoniae* comprising a size-reducing treatment selected from thermal treatment, sonic treatment, chemical hydrolysis, endolytic enzyme treatment, and physical shear, and precipitation with isopropyl alcohol to reduce polydispersity of the size reduced capsular polysaccharide. US20090010959 discusses sizing of pneumococcal polysaccharides by microfluidization using Microfluidics (High pressure homogenizer).

Microfluidization has improvements over conventional homogenizers, however it has very high processing cost. Ozonolysis can only be used with polysaccharides containing β-D-aldosidic linkages, and only few endoglycanases have been isolated till date. However, methods such as microwave utilize high amount of power and may have a deleterious effect on labile antigenic epitopes of polysaccharides. Further, sonication generates heat, has complex mechanism and expensive fabrication process and the excessive heat generation during sonication may denature polysaccharides.

Methyl pentose present in the polysaccharides of certain *Streptococcus pneumoniae* is important for eliciting an immune response. The WHO further mentions that the percentage of methyl pentose along with that of nitrogen, phosphorus, uronic acid, hexosamine, methyl pentose and O-acetyl groups in *Streptococcus pneumoniae* polysaccharides is indicative of the polysaccharide composition. WHO recommends following methyl pentose percentage for *Streptococcus pneumoniae* serotypes: >38 for serotype 2; >10 for serotype 4; >25 for serotype 5; ≥15 for serotype 6B; >13 for serotype 7F; >20 for serotypes 17A, 17F, 19A, 19F; ≥14 for serotype 18C; >20 for serotypes; >25 for serotype 22F; and >37 for serotype 23F.

Vaccine production is extremely challenging due to complexity of the vaccine molecule itself and rigorous safety norms to be complied, in confluence with the demand to supply low cost and efficacious vaccines catering to a large population especially from low and middle income countries. Purification process is vital in vaccine production and accounts for the major part of production expenses. As described herein above, majority of the purification processes being used currently are multi-step, time and labour intensive, expensive, provide polysaccharide having low recovery (of about 50%), high polydispersity, high impurity content (15% protein, 25% nucleic acid, >5 mol % CWPs) and non preservation of methyl pentose.

Therefore, there is an urgent unmet need for alternative, cost effective and simple platform methods for simultaneously obtaining purified and depolymerized bacterial polysaccharides with high yield and improved purity profile, such that the resultant polysaccharide-protein conjugate vaccine exhibits improved stability and immunogenicity.

OBJECTS

An object of the present disclosure is to ameliorate one or more problems of the prior art or to at least provide a useful alternative.

An object of the present disclosure is to provide a method for obtaining purified bacterial polysaccharide.

Another object of the present disclosure is to provide a method of lysis and subsequent rapid purification of bacterial polysaccharides.

Still another object of the present disclosure is to provide a simple and cost effective method for obtaining purified bacterial polysaccharide. Said method does not utilize phenol, TRITON™-, enzymes, CTAB, activated carbon, chromatography, ammonium sulphate or ethanol.

Yet another object of the present disclosure is to provide a method comprising minimum steps for obtaining purified and depolymerized bacterial polysaccharide that is devoid of a separate step of sizing the polysaccharides.

Another object of the present disclosure is to provide a method for obtaining purified bacterial polysaccharide having high polysaccharide recovery (at least 60%), low impurity content (proteins less than 3%, nucleic acids less than 2%, CWPs not more than 2 mol % and >10% methyl pentose).

Yet another object of the present disclosure is to provide efficient and reproducible methods for bacterial capsular polysaccharide sizing thereby providing low polydispersity polysaccharide material that increases the number of reactive end groups, both factors contribute to an increased frequency of covalent bond formation. Low polydispersity polysaccharide (PS) gives conjugate with narrow distribution of size. This helps to have better conjugation process control, higher recoveries when concentrated on a membrane as well as ease in purification of crude polysaccharide protein conjugate. Further the polysaccharide antigen obtained remains structurally intact, i.e. the epitopic confirmation is retained and also has a peculiar average molecular size which ensures that resultant polysaccharide-protein conjugate shows optimal immunogenicity.

Still another object of the present disclosure is to provide immunogenic compositions comprising the purified bacterial polysaccharide.

Other objects and advantages of the present disclosure will be more apparent from the following description, which is not intended to limit the scope of the present disclosure.

SUMMARY

The present disclosure provides a method for obtaining purified and sized bacterial polysaccharides.

The method involves treating a fermentation harvest with an acid to separate the polysaccharide from impurities (protein, nucleic acid and cell debris, such as cell wall polysaccharide [CWPS]) to obtain purified and sized bacterial polysaccharides.

The method may include an optional step of treating the fermentation harvest with a lytic agent, followed by centrifugation to separate cell-free supernatant. The cell-free supernatant is subjected to diafiltration and concentration followed by incubation/treatment with an acid, which results in the removal of the impurities and also depolymerizes/sizes/fragments the polysaccharide to the desired molecular weight. The supernatant may be subjected to further incubation. Following the centrifugation, the pH may be raised in the range of 5.5 to 6.5 using a pH adjusting agent, followed by diafiltration to obtain the purified and sized bacterial polysaccharide of the present disclosure.

BRIEF DESCRIPTION OF THE DRAWINGS

The present disclosure will now be described with the help of the accompanying drawing, in which.

DETAILED DESCRIPTION

Figure 1:
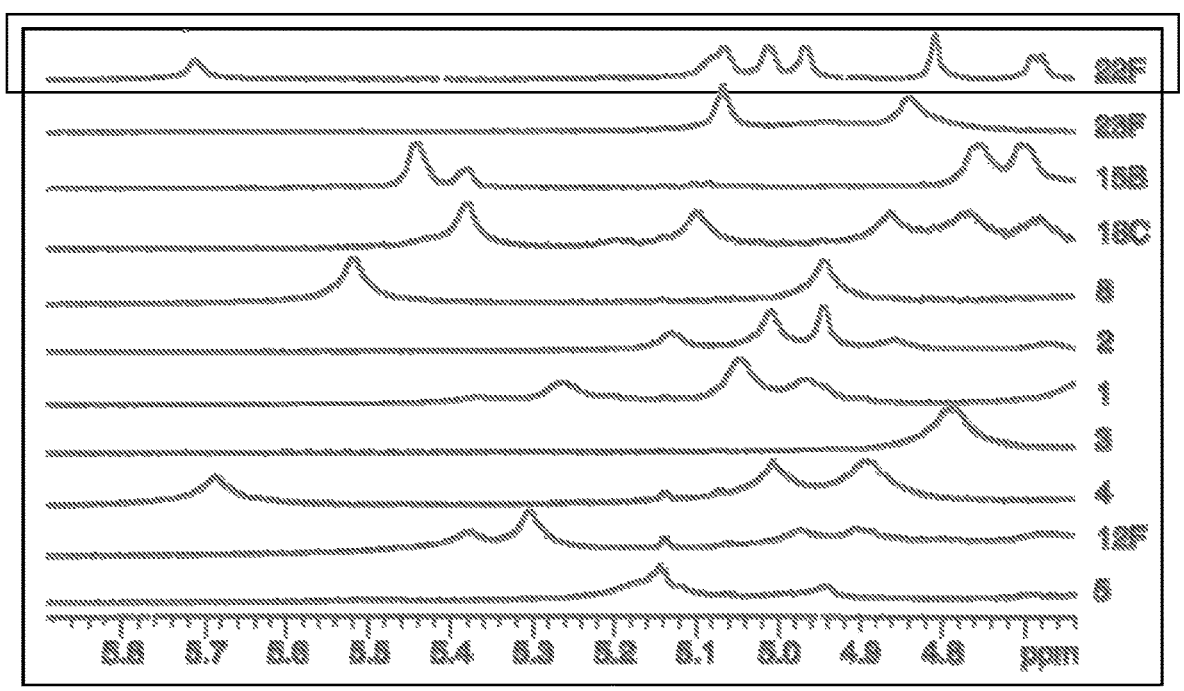
FIG. 1 illustrates the literature 1H NMR spectrum of purified *S. pneumoniae* polysaccharide for serotype 22F.

Although the present disclosure may be susceptible to different embodiments, certain embodiments are shown in the following detailed discussion, with the understanding that the present disclosure can be considered an exemplification of the principles of the disclosure and is not intended to limit the scope of disclosure to that which is illustrated and disclosed in this description.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an", and "the" may be intended to include the plural forms as well, unless the context clearly suggests otherwise. The terms "comprises", "comprising", "including", and "having", are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

The present disclosure envisages a simple and cost effective method for obtaining purified bacterial polysaccharides. The purified polysaccharides may be used as antigens, or may be used for production of antibodies, and vaccines. The purified polysaccharides may be used alone or may be conjugated to carrier molecules.

In an aspect of the present disclosure, there is provided a method for obtaining purified bacterial polysaccharides. The method comprises a single step, wherein impurities such as proteins and nucleic acid are removed from the crude polysaccharides and at the same time the molecular weight of the crude polysaccharide is also reduced to a desired range.

The method for obtaining the purified bacterial polysaccharides in accordance with the present disclosure comprises incubating/treating a fermentation harvest comprising polysaccharide with an acid at a pre-determined temperature and pH for a pre-determined time period.

In an embodiment of the present disclosure there is provided a method for obtaining purified and sized bacterial polysaccharides, the method comprising the following steps:
(a) providing a fermentation harvest comprising bacterial cell, polysaccharide, proteins, nucleic acid and cell debris; and
(b) treating the fermentation harvest with an acid to separate the polysaccharide from protein, nucleic acid and cell debris to obtain purified and sized bacterial polysaccharides.

The pH of the fermentation harvest may be in the range of 5.8 to 6.8.

The cell debris may contain cell wall polysaccharide (CWPs), which is considered a contaminant in the final product.

Typically, the bacterial cell in the fermentation harvest is first lysed, using known techniques, to release the polysaccharide. Cell lysis may be carried out using detergents (such as deoxycholate sodium, DOC), enzymes (such as lysozymes), mechanical/physical means (such as sonication), and the like. The fermentation harvest containing the lysed bacterial cells may be then centrifuged and filtered. Centrifugation helps in separation and removal of undesired cell debris, colloids and large aggregates thereby reducing burden on downstream processing. Filtration, such as microfiltration (e.g. 0.2 $\mu$) aids in the removal of fermentation media components. In an embodiment of the present disclosure, post fermentation, cell-free supernatant is subjected to tangential flow filtration (TFF) using a membrane having 100 kDa to 150 kDa molecular weight cut off (MWCO).

The method of the present disclosure may be used for obtaining purified polysaccharides from any bacteria. In accordance with the embodiments of the present disclosure, the polysaccharides may be derived from bacteria selected from the group consisting of, but not limited to, *Streptococcus* spp. such as Group A *Streptococcus*, Group B *Streptococcus* (group Ia, Ib, II, III, IV, V, VI, VII, VII, VIII, and IX.); *Streptococcus pneumoniae*, *Streptococcus pyogenes*; *Streptococcus agalactiae*; *Streptococcus viridans*; *Salmonella* spp. such as, *Salmonella typhi*, *Salmonella paratyphi*, *Salmonella enteritidis*; *Salmonella typhimurium*; *Shigella* spp.; *E. coli*; *Neisseria meningitidis* (serotypes such as A, B, C, E29, H, I, K, L, M, W135, X, Y, Z, etc); *Neisseria gonorrhoeae*; *Haemophilus influenzae*; *Haemophilus* pneumonia; *Helicobacter pylori*; *Chlamydia pneumoniae*; *Chlamydia trachomatis*; *Ureaplasma urealyticum*; *Mycoplasma pneumoniae*; *Staphylococcus* spp. such as *Staphylococcus aureus*, *Staphylococcus aureus* type 5, *Staphylococcus aureus* type 8; *Enterococcus faecalis*; *Enterococcus faecium*; *Bacillus anthracis*; *Vibrio cholerae*; *Pasteurella pestis*; *Pseudomonas aeruginosa*; *Campylobacter* spp. such as *Campylobacter jejuni*, *Clostridium* spp. such as *Clostridium difficile*; *Mycobacterium* spp. such as *Mycobacterium tuberculosis*; *Moraxella catarrhalis*; *Klebsiella pneumoniae*; *Treponema* spp.; *Borrelia* spp.; *Borrelia burgdorferi*; *Leptospira* spp.; *Hemophilus ducreyi*, *Corynebacterium diphtheria*, *Bordetella pertussis*; *Bordetella parapertussis*; *Bordetella bronchiseptica*; *Ehrlichia* spp.; and *Rickettsia* spp.

In an embodiment, the bacterial polysaccharide is derived from *Streptococcus pneumoniae* serotype selected from the group consisting of, but not limited to, 1, 2, 3, 4, 5, 6A, 6B, 6C, 6D, 6E, 6G, 6H, 7A, 7B, 7C, 7F, 8, 9A, 9L, 9F, 9N, 9V, 10F, 10B, 10C, 10A, 11A, 11F, 11B, 11C, 11D, 11E, 12A, 12B, 12F, 13, 14, 15A, 15C,15B, 15F, 16A, 16F, 17A, 17F, 18C, 18F, 18A, 18B, 19A, 19B, 19C, 19F, 20, 20A, 20B, 21, 22A, 22F, 23A, 23B, 23F, 24A, 24B, 24F, 25F, 25A, 27, 28F, 28A, 29, 31, 32A, 32F, 33A, 33C, 33D, 33E, 33F, 33B, 34, 45, 38, 35A, 35B, 35C, 35F, 36, 37, 38, 39, 40, 41F, 41A, 42, 43, 44, 45, 46, 47F, 47A, and 48.

The bacteria used in the present disclosure can be sourced from known collection centres, such as Centers for Disease Control and Prevention (CDC), Atlanta USA; CBER/FDA, USA; ATCC, USA; NIH, USA; NIAID, USA; and PHE, UK. In one embodiment, the *Streptococcus pneumoniae* serotypes are sourced from CDC, Atlanta, USA.

Acids that can be used in the present disclosure include, but are not limited to, trifluoroacetic acid, trichloroacetic acid, sulphuric acid, phosphoric acid, acetic acid, hydrochloric acid, nitric acid. In accordance with the embodiments of the present disclosure, the concentration of the acid in the fermentation harvest is in the range of 0.1 M to 20 M, 1 M to 10 M, 1M to 4M, preferably 2 M to 5 M (the concentration mentioned here refers to the final concentration of the acid in the fermentation harvest).

In an embodiment, the acid is Trifluoroacetic acid (TFA). TFA is a mineral acid with the chemical formula CF3CO2H. It is a structural analogue of acetic acid with all three of the acetyl group's hydrogen atoms replaced by fluorine atoms and is a colorless liquid with a vinegar like odor. TFA is a stronger acid than acetic acid, having an acid ionisation constant that is approximately 34,000 times higher, as the highly electronegative fluorine atoms and consequent electron-withdrawing nature of the trifluoromethyl group weakens the oxygen-hydrogen bond (allowing for greater acidity) and stabilises the anionic conjugate base.

The temperature during acid treatment may be in the range of 2° C. to 100° C., 10° C. to 90° C., 20° C. to 80° C., preferably between 20° C. to 60° C.

The pH during acid treatment may be less than 2, less than 1.5, less than 1.0, preferably less than 0.5.

The incubation time period may range from 1 hour to 10 hours, preferably 2 hours to 6 hours.

The incubation/treatment of the crude polysaccharide with the acid results in the precipitation of the impurities, namely, proteins and nucleic acids. The precipitated impurities are optionally removed by centrifugation. The centrifugation may be carried out between 8000 g to 18000 g, at a temperature between 4° C. to 10° C. for a time period of 10 minutes to 30 minutes. In an embodiment, the supernatant may be further incubated as per the parameters described hereinabove to remove any residual impurities present and to obtain the desired molecular size of the polysaccharide.

The method of the present disclosure is capable of simultaneous purification and sizing of polysaccharides. It is observed that the impurities including protein, nucleic acid and CWPs are removed during the treatment with the acid. Sizing/depolymerization of the polysaccharide is also initiated at this time. The resulting mixture containing cell debris and impurities is centrifuged to separate the impurities. The supernatant is then further incubated to obtain polysaccharide having the desired molecular size. However, there is no further addition of TFA at this stage; rather the TFA present in the supernatant is capable of sizing/depolymerizing the polysaccharides to the desired molecular size. The residual TFA is removed from the final polysaccharide during the subsequent diafiltration step. In order to cease the action of TFA, dibasic sodium is added prior to the diafiltration step.

The bacterial polysaccharide is periodically monitored to ascertain/determine the molecular size. Typically, chromatographic techniques, such as Size Exclusion High Performance Liquid Chromatography (SEC-HPLC) are used to ascertain/determine the molecular size of the bacterial polysaccharide. Typically, the average molecular size of the bacterial polysaccharide after the incubation/treatment with TFA is in the range of 10 kDa to 1000 kDa, 50 kDa to 600 kDa, 50 kDa to 300 kDa, 50 kDa to 250 kDa, preferably 100 to 200 kDa. In an exemplary embodiment of the present disclosure, the average molecular size of the purified bacterial polysaccharide is in the range of 50 kDa to 200 kDa. Residual acid may be removed during the subsequent diafiltration steps.

Conventionally, the polysaccharides are sized to the desirable molecular weight in a separate step using techniques, such as microwave, sonication, microfluidization, and high pressure homogenization. However, microwave technique results in high consumption of power and also the polysaccharide structure is easy to be destroyed. High pressure homogenization is expensive; results in generation of heat, which could damage the product of interest; and also further time-consuming methods are required to purify the product. Sonication results in generation of heat, which may degrade the product of interest. On the other hand, the method of the present disclosure employs simultaneous purification and sizing of the polysaccharides, and thereby saving time, labour and cost.

After the incubation/treatment is over, the pH of the mixture is raised to be in the range of 5.5 to 6.5 using a pH adjusting agent. In an embodiment of the present disclosure, the pH adjusting agent is disodium hydrogen phosphate ($Na_2HPO_4$). The pH adjusting agent is slowly added to the mixture with agitation to raise the pH. Other pH adjusting agents, such as dipotassium hydrogen phosphate ($K_2HPO_4$) are also envisaged by the method of the present disclosure.

Once the pH of the mixture is maintained in the range of 5.5 to 6.5, the mixture is subjected to diafiltration in the presence of a suitable diluent using a membrane having 5 kDa to 30 kDa a molecular weight cut off (MWCO) to obtain the purified and sized bacterial polysaccharide. In a preferred embodiment, diafiltration is carried out using a 10 kDa a MWCO. In another preferred embodiment, the diluent is water for injection. In an embodiment, the purified bacterial polysaccharide has a pH in the range of 6.0 to 7.0.

Typically, the recovery of purified polysaccharides using the method of the present disclosure is more than 60%.

Further, the method of the present disclosure is capable of substantially reducing impurities from the bacterial polysaccharide. In an embodiment, the impurities are reduced to, i.e., proteins to less than 3% and nucleic acids to less than 2%. In a preferred embodiment, the protein content is reduced to less than 2% and the nucleic acid is reduced to less than 0.5%. Still further, the purified and sized bacterial polysaccharide obtained by the process of the present disclosure has polysaccharide polydispersity less than 2 and CWPs content not more than 2 mol %.

In the present disclosure, it is surprisingly found that TFA is capable of removing the impurities from the crude polysaccharides and also size the polysaccharide to a range of 10 kDa to 1000 kDa by controlling parameters, such as pH and concentration of TFA, reaction time and temperature of the reaction.

Conventional processes for obtaining purified bacterial polysaccharide are time consuming, multi-step and labour intensive, using enzyme treatments, single/multiple chromatographic steps, tangential flow filtration (TFF) systems/cassettes. This is followed by separate sizing process involving physical, chemical or mechanical means. Whereas, the method of the present disclosure is a single step process using TFA resulting in simultaneous removal of impurities as well as sizing of the crude polysaccharide in the desirable range. Also, the use of TFA aids in the lysis of the bacterial cell, thereby releasing the polysaccharide, which is then further purified and sized to obtain the purified polysaccharide. The method of the present disclosure also avoids chemicals, such as CTAB, alcohol, and ammonium sulphate; enzymatic treatment, and chromatographic steps, whereby further labour intensive and expensive down stream processing steps are prevented. Hence, the method of the present disclosure is simple, cost effective, rapid, and provides high recovery of the polysaccharide.

In an embodiment of the present disclosure, the method or producing purified and sized bacterial polysaccharides does not use a lytic agent and comprises the following steps:

(a) providing a fermentation harvest comprising bacterial cell;
(b) subjecting the fermentation harvest to centrifugation to separate cell free supernatant;
(c) concentrating and filtering the cell free supernatant of step (b);
(d) treating the concentrated and filtered cell free supernatant of step (c) with an acid having concentration in the range of 2 M to 5M at 20° C. to 60° C. and pH in the range of 0.1 to 2;
(e) subjecting the acid treated mixture of step (d) to centrifugation to remove precipitated impurities;
(f) incubating the supernatant of step (e) at a temperature in the range of 20° C. to 50° C.;
(g) raising the pH of the solution of step (f) using a pH adjusting agent;
(h) diafiltering the solution of step (g) to increase the concentration of polysaccharide in the solution; and
(i) filtering the concentrated polysaccharide of step (h) to obtain purified and sized polysaccharide having protein content less than 3%, nucleic acid content less than 2%, CWPs content not more than 2 mol %, polydispersity less than 2, molecular size in the range of 10 kDa to 600 kDa (SEC-HPLC), and >10% methyl pentose content.

After fermentation, the fermentation harvest is centrifuged to remove the cell debris, this is called as cell free supernatant. In order to remove the media components the cell free supernatant is further diafiltered using 100 kDa cutoff membrane. This media and cell free supernatant called as 100 kDa crude polysaccharide and is used for further processing.

Typically, the filtration in step (c) is carried out on 100 kDa tangential flow filtration (TFF) membrane at a pH in the range of 5.5 to 8 and the filtration in step (h) is carried out on 10 kDa tangential flow filtration (TFF) membrane at a pH in the range of 4 to 6. The filtration in step (i) is carried out using 0.2 µ filter at a pH in the range of 6 to 7.

Cells may be in the form of a wet cell paste or are suspended in an aqueous medium.

In another embodiment of the present disclosure, the method or producing purified and sized bacterial polysaccharides uses a lytic agent. Typically, the fermentation harvest is treated with a lytic agent prior to treatment with an acid.

In accordance with the embodiments of the present disclosure, the lytic agent can be selected from mechanical and non-mechanical lytic agents.

The mechanical lytic agent can be selected from sonication, high pressure homogenization and bead mill.

In one embodiment, the non-mechanical lytic agent is a chemical lytic agent selected from alkali and detergents. Typically, the chemical lytic agent can be selected from the group consisting of deoxycholate sodium (DOC), sodium dodecyl sulphate (SDS), decanesulfonic acid, tert-octylphenoxy poly(oxy ethylene) ethanols, octylphenol ethylene oxide condensates, N-lauryl sarcosine sodium (NLS), lauryl iminodipropionate, chenodeoxycholate, hyodeoxycholate, glycodeoxycholate, taurodeoxycholate, taurochenodeoxycholate, cholate, TRITON™ X, TWEEN® (20, 80), EDTA, urea and cetyltrimethylammonium bromide (CTAB).

In another embodiment, the non-mechanical lytic agent can be a physical lytic agent selected from thermal lysis, cavitation and osmotic shock.

In still another embodiment, the non-mechanical lytic agent can be an enzyme selected from lysozyme, lysostaphin, zymolase, proteinase K, protease and glycanase. In an embodiment of the present disclosure, the method for producing purified and sized bacterial polysaccharides comprises the following steps:
(a) providing a fermentation harvest comprising bacterial cell;
(b) treating the fermentation harvest with a lytic agent to obtain a mixture of polysaccharide, proteins, nucleic acid and cell debris;
(c) subjecting the lytic agent treated fermentation harvest of step (b) to centrifugation to separate cell free supernatant;
(d) concentrating and filtering the cell free supernatant of step (c);
(e) treating the concentrated and filtered cell free supernatant of step (d) with an acid having concentration in the range of 2 M to 5M at 20° C. to 60° C. and pH in the range of 0.1 to 2;
(f) subjecting the acid treated mixture of step (e) to centrifugation to remove precipitated impurities;
(g) incubating the supernatant of step (f) at a temperature in the range of 20° C. to 50° C.;
(h) raising the pH of the solution of step (g) using a pH adjusting agent;
(i) diafiltering the solution of step (h) to increase the concentration of polysaccharide in the solution; and
(j) filtering the concentrated polysaccharide of step (i) to obtain purified and sized polysaccharide having protein content less than 3%, nucleic acid content less than 2%, CWPs content not more than 2 mol %, polydispersity less than 2, molecular size in the range of 10 kDa to 600 kDa (SEC-HPLC), and >10% methyl pentose content.

Typically, the step of cell lysis is carried out at a pH in the range of 5 to 7.

After fermentation, the treatment with the lytic agent is carried out for to lysis of cells. The fermentation harvest is then centrifuged to remove the cell debris, this is called as cell free supernatant. In order to remove the media components the cell free supernatant is further diafiltered using 100 kDa cutoff membrane. This media and cell free supernatant called as 100 kDa crude polysaccharide and is used for further processing.

The filtration in step (d) is carried out on 100 kDa tangential flow filtration (TFF) membrane at a pH in the range of 5.5 to 8 and the filtration in step (i) is carried out on 10 kDa tangential flow filtration (TFF) membrane at a pH in the range of 4 to 6. The filtration in step (j) is carried out using 0.2 µ filter.

The present disclosure further envisages the use of at least one chromatography step to obtain the purified and sized polysaccharide. The chromatography can be selected from the group consisting of ion-exchange (cationic or anionic), affinity chromatography, hydrophilic-interaction, hydrophobic-interaction, size-exclusion, hydroxyl apatite, gel-permeation chromatography, Cibacron Blue pseudo affinity sorbent, mixed mode chromatography sorbent, membrane chromatography, Capto Adhere, TOYOPEARL MX-Trp-650M, Cellufine MAX AminoButyl, monolith chromatography device, adsorbent chromatography, lectin agarose column, and Amberlite column.

Further, the method of the present disclosure may comprise a step of treatment with one or more chemical/biological reagent at any stage of the method. The reagent can be selected from the group consisting of cetyl trimethyl ammonium bromide (CTAB), hexadimethrine bromide and myristyltrimethylammonium, TRITON™, acetate, sodium carbonate, zinc, enzymes, alcohol (ethanol, isopropanol), phenol, acetone, salts (magnesium, calcium), sodium dodecyl sulfate (SDS), polysorbates, sodium sarcosine, NaCl, urea, formaldehyde, ammonium chloride, ethylenediaminetetraacetic acid (EDTA), ammonium sulfate, mineral acid, organic acid, metal cations, toluene, chloroform, alkali, ascorbic acid, tetrabutylammonium, potassium chloride, alkyl sulfates, sodium deoxycholate, sodium dodecyl sulfonate, sodium s-alkyl sulfates, sodium fatty alcohol polyoxyethylene ether sulfates, sodium oleyl sulfate, N-oleoyl poly(amino acid) sodium, sodium alkylbenzene sulfonates, sodium α-olefin sulfonates, sodium alkyl sulfonates, a-sulfo monocarboxylic acid esters, fatty acid sulfoalkyl esters, succinate sulfonate, alkyl naphthalene sulfonates, sodium alkane sulfonates, sodium ligninsulfonate, sodium alkyl glyceryl ether sulfonates, DNase and/or RNase, Benzonase, Mutanolysin/lysozyme, beta-D-N-acetyl glucosaminidase, and Proteinase K.

The purified and sized polysaccharide may be subjected to an additional size reduction step selected from thermal treatment, sonic treatment, chemical hydrolysis, endolytic enzyme treatment, and physical shear, Gaulin-homogenizer, and sonication.

In an embodiment, there is provided a bacterial polysaccharide obtained by the method of the present disclosure. The polysaccharide thus obtained has protein content less than 3%, nucleic acid content less than 2%, molecular size in the range of 10 kDa to 600 kDa (SEC-HPLC), and polysaccharide recovery of at least 60%.

The purified and sized polysaccharide obtained by the method of the present disclosure may be used as antigens, or may be used for production of antibodies, and vaccines (plain polysaccharide or polysaccharide-protein conjugate). The purified polysaccharides may be used alone or may be conjugated to carrier molecules.

In an embodiment, there is provided an immunogenic composition comprising Streptococcus pneumoniae polysaccharides, wherein the polysaccharide is obtained by the method of the present disclosure having protein content less than 3%, nucleic acid content less than 2%, molecular size in the range of 10 kDa to 300 kDa (SEC-HPLC) and wherein the polysaccharide is derived from Streptococcus pneumoniae serotype selected from the group consisting of 1, 2, 3, 4, 5, 6A, 6B, 6C, 6D, 6E, 6G, 6H, 7A, 7B, 7C, 7F, 8, 9A, 9L, 9F, 9N, 9V, 10F, 10B, 10C, 10A, 11A, 11F, 11B, 11C, 11D, 11E, 12A, 12B, 12F, 13, 14, 15A, 15C, 15B, 15F, 16A, 16F, 17A, 17F, 18C, 18F, 18A, 18B, 19A, 19B, 19C, 19F, 20, 20A, 20B, 21, 22A, 22F, 23A, 23B, 23F, 24A, 24B, 24F, 25F, 25A, 27, 28F, 28A, 29, 31, 32A, 32F, 33A, 33C, 33D, 33E, 33F, 33B, 34, 45, 38, 35A, 35B, 35C, 35F, 36, 37, 38, 39, 40, 41F, 41A, 42, 43, 44, 45, 46, 47F, 47A, and 48.

In accordance with the embodiments of the present disclosure, the immunogenic composition is a 7, 8, 9, 10, 11, 12, 13, 14, 15, 16, 17, 18, 19, 20, 21, 22, 23, 24, 25, 26, 27, 28, 29, or 30-valent pneumococcal polysaccharide-protein conjugate composition.

In an embodiment, the immunogenic composition comprises polysaccharides that are conjugated to carrier protein selected from CRM197, tetanus toxoid (TT), diphtheria toxoid (DT), Neisseria meningitidis outer membrane complex, fragment C of tetanus toxoid, pertussis toxoid, protein D of H. influenzae, E. coli LT, E. coli ST, and exotoxin A from Pseudomonas aeruginosa, outer membrane complex c (OMPC), porins, transferrin binding proteins, pneumolysin, pneumococcal surface protein A (PspA), pneumococcal surface adhesin A (PsaA), pneumococcal PhtD, pneumococcal surface proteins BVH-3 and BVH-11, protective antigen (PA) of Bacillus anthracis and detoxified edema factor (EF) and lethal factor (LF) of Bacillus anthracis, ovalbumin, keyhole limpet hemocyanin (KLH), human serum albumin, bovine serum albumin (BSA) and purified protein derivative of tuberculin (PPD), cholera toxin B, synthetic peptides, heat shock proteins, pertussis proteins, cytokines, lymphokines, hormones, growth factors, artificial proteins comprising multiple human CD4+T cell epitopes from various pathogen-derived antigens such as N 19, iron-uptake proteins, toxin A or B from C. difficile and S. agalactiae proteins or any equivalents thereof.

In an embodiment, there is provided an immunogenic composition comprising 10 distinct Streptococcus pneumoniae polysaccharide-protein conjugates wherein
  the polysaccharide is obtained by the method of the present disclosure having protein content less than 3%, nucleic acid content less than 2%, CWPs content not more than 2 mol %, molecular size in the range of 10 kDa to 300 kDa (SEC-HPLC);
  the polysaccharides are derived from serotypes 1, 5, 6A, 6B, 7F, 9V, 14, 19A, 19F and 23F; and
  all the polysaccharides are conjugated to CRM197 as the carrier protein.

In another embodiment, there is provided an immunogenic composition comprising 17 distinct Streptococcus pneumoniae polysaccharide-protein conjugates wherein
  the polysaccharide is obtained by the method of the present disclosure having protein content less than 3%, nucleic acid content less than 2%, CWPs content not more than 2 mol %, molecular size in the range of 10 kDa to 300 kDa (SEC-HPLC);
  the polysaccharides are derived from serotypes 1, 2, 3, 4, 5, 6A, 6B, 7F, 9V, 12F, 14, 15B, 18C, 19A, 19F, 22F and 23F; and
  serotype 3 is conjugated to CRM197, serotype 18C is conjugated to CRM197, serotype 4 is conjugated to DT, serotype 15B is conjugated to TT and serotype 22F is conjugated to TT.

The polysaccharides can be conjugated to the carrier protein using known conjugation chemistry, such as cyanylation chemistry, CNBr chemistry, reductive amination chemistry, and carbodiimide chemistry.

Non-limiting examples of cyanylation agent include 1-cyano-4-dimethylaminopyridinium tetrafluroborate (CDAP), 1-cyano-4-pyrrolidinopyridinium tetrafluorborate (CPPT), 1-cyano-imidazole (1-CI), 1-cyanobenzotriazole (1-CBT), 2-cyanopyridazine-3 (2H) one (2-CPO), and a functional derivative or modification thereof.

In one embodiment, the polysaccharide can be conjugated to the carrier protein in the presence of a linker selected from the group comprising hexanediamine, ethylene diamine, hydrazine, adipic dihydrazide, and 1,6-diaminooxyhexane.

In another embodiment, the polysaccharide can be conjugated to the carrier protein in the absence of a linker.

The immunogenic composition may further comprise pharmaceutically acceptable excipients selected from surfactants, stabilizers, buffers, diluents, adjuvants, preservatives and solvents.

In another embodiment, polysaccharide-protein conjugate vaccine compositions prepared using the polysaccharides of the present disclosure are multi-dose compositions comprising at least one preservative. The preservative may be selected from the group comprising 2-phenoxyethanol, benzethonium chloride (Phemerol), phenol, m-cresol, thiomersal, formaldehyde, methyl paraben, propyl paraben, benzalkonium chloride, benzyl alcohol, chlorobutanol, p-chlorm-cresol, benzyl alcohol and combinations thereof.

One of the critical parameters for immunogenicity for a number of Streptococcus pneumoniae serotypes is the amount of methyl pentose groups in the polysaccharide. Conventional processes fail to retain the required amount of methyl pentose in the polysaccharides. However, it is observed that the method of present disclosure is capable of preserving the methyl pentose groups present in the polysaccharide of certain serotypes of *Streptococcus pneumoniae* as required by the WHO guidelines.

Typically, the methyl pentose content for *Streptococcus pneumoniae* serotypes 2, 4, 5, 6B, 7F, 12F, 17A, 17F, 19A, 19F and 23F obtained by the method of the present disclosure is ≥10%. Specifically, serotype 2 has a methyl pentose content of at least 50%, serotype 18C has a methyl pentose content of at least 25% and serotype 22F has a methyl pentose content of at least 35%.

In another embodiment, the method of the present disclosure is capable of preserving the desired amount of other groups critical for immunogenicity, such as pyruvates, uronic acid, hexosamine, glycerol, acetate and O-acetyl groups. In one embodiment, the acetate content in the polysaccharides for serotypes 22F and 15B is about 1 mM per mM of the respective polysaccharide. In another embodiment, the glycerol content in the polysaccharide 15B is about 1 mM per mM of the polysaccharide.

Further, it is seen that the free polysaccharide and free protein content of polysaccharide-carrier protein conjugates prepared using polysaccharides obtained by the method of present disclosure are within the specified limit and hence conjugates are found to be stable.

The present disclosure is further described in light of the following examples which are set forth for illustration purpose only and not to be construed for limiting the scope of the disclosure.

EXAMPLES

The *Streptococcus pneumoniae* serotypes 2, 18C and 22F were sourced from Centers for Disease Control and Prevention (CDC), Atlanta, USA.

U.S. Pat. No. 9,249,439 is being incorporated with reference to the fermentation processes utilized for all *S. pneumoniae* serotypes

Example-1a: Obtaining Purified and Sized Polysaccharide from *Streptococcus pneumoniae* Serotype 2 [Using DOC]

Sized and purified polysaccharide from *Streptococcus pneumoniae* serotype 2 was obtained as per the method illustrated in Table-1a.

TABLE-1a

| S. No. | Step | Reagent/ Instrument used | pH | Temperature (° C.) | Time (Minutes) |
|---|---|---|---|---|---|
| 1. | Fermentation [Agitation 150 RPM & 0.2 vvm aeration] | SS Fermenter 20L working | 7.1 | 36.5 | 360 |
| 2. | Cell Lysis (DOC) | In SS Fermenter (From 12% stock 310 mL added to get final 2.5% DOC conc.) | 6.3 | 15 | 840 |
| 3. | Cell free supernatant | Batch mode centrifugation (12000 RCF, 45 minutes, 15° C.) | | 15 | 45 |
| 4. | Diafiltration (DF) & concentration | 100 kDa TFF | 6.5 | RT | 180 |
| 5. | TFA treatment [PS sizing initiate & impurities precipitated] | Conc. TFA (final conc. 3.24M) (e.g. 100 mL reaction mixture 25 mL conc. TFA + 75 mL crude PS) | 0.2 | 40 | 60 |
| 6. | Centrifugation [To remove the precipitate] | Batch mode cent. (15000 RCF, 30 minutes, 12 deg. C.) | | 12 | 30 |
| 7. | Incubation [OR incubation continued till the desired molecular weight was reached] | In water bath | | 40 | 480 |
| 8. | Termination of reaction [pH adjustment before DF & concentration] | Di sodium hydrogen phosphate (solid added as per Q.R.) (For 100 mL reaction mixture 55 g added, which is equal to 3.8M) | 5.5 | RT | 20 |
| 9. | Diafiltration & concentration [DF continued till the condition of permeates is equal to WFI conductivity] | 10 kDa TFF | | RT | 300 |

TABLE-1a-continued

| S. No. | Step | Reagent/ Instrument used | pH | Temperature (° C.) | Time (Minutes) |
|---|---|---|---|---|---|
| 10. | Final filtration | 0.2 micron filter | 6.5 | RT | 15 (Depends on the batch size) |

Abbreviations:
RT—room temperature,
DOC—Deoxycholic acid,
DF—diafiltration,
TFF—tangential flow filtration,
kDa—kilo Dalton,
PS—polysaccharides,
TFA—trifluoroacetic acid,
RCF—Relative Centrifugal Force,
Q.R.—quantity required,
WFI—water for injection Example-1b: Obtaining Purified and Sized Polysaccharide from *Streptococcus pneumoniae* Serotype 18C [Using DOC]

Sized and purified polysaccharide from *Streptococcus pneumoniae* serotype 18C was obtained as per the method illustrated in Table-1b.

TABLE-1b

| S. No. | Step | Reagent/ Instrument used | pH | Temperature (° C.) | Time (Minutes) |
|---|---|---|---|---|---|
| 1. | Fermentation [Agitation 100 RPM & 0.2 vvm aeration] | SS Fermenter 20L working | 7.1 | 36.5 | 345 |
| 2. | Cell Lysis (DOC) | In SS Fermenter (From 12% stock 530 mL added to get final 2.5% DOC conc.) | 6.3 | 15 | 840 |
| 3. | Cell free supernatant | Batch mode cent. (12000 RCF, 45 minutes, 15° C.) | | 15 | 45 |
| 4. | Diafiltration (DF) & concentration | 100 kDa TFF | 6.1 | RT | 180 |
| 5. | TFA treatment [PS sizing initiate & impurities precipitated] | 50% TFA as per Q.R. (e.g. 100 mL PS + 45 mL 50% diluted TFA added (final conc. 2.92M)) | 0.5 | 30 | 60 |
| 6. | Centrifugation [To remove the precipitate] | Batch mode cent. (15000 RCF, 30 minutes, 12° C.) | | 12 | 30 |
| 7. | Incubation OR incubation continued till the desired molecular weight was reached] | In water bath | | 30 | 1440 |
| 8. | Termination of reaction [pH adjustment before DF & concentration] | Di sodium hydrogen phosphate (For 100 mL reaction mixture 25 g added, which is equal to 1.73 M ) | 5.5 | RT | 20 |
| 9. | DF & concentration [DF continued till the condition of permeates is equal to WFI conductivity] | 10 kDa TFF | | RT | 300 |

TABLE-1b-continued

| S. No. | Step | Reagent/ Instrument used | pH | Temperature (° C.) | Time (Minutes) |
|---|---|---|---|---|---|
| 10. | Final filtration | 0.2 micron filter | 6.2 | RT | 15 (Depends on the batch size) |

Abbreviations:
RT— room temperature,
DOC—Deoxycholic acid,
DF—diafiltration,
TFF—tangential flow filtration,
kDa—kilo Dalton,
PS—polysaccharides,
TFA—trifluoroacetic acid,
RCF—Relative Centrifugal Force,
Q.R.—quantity required,
WFI—water for injection Example-1c: Obtaining Purified and Sized Polysaccharide from *Streptococcus pneumoniae* Serotype 22F [Using DOC]

Sized and purified polysaccharide from *Streptococcus pneumoniae* serotype 22F was obtained as per the method illustrated in Table-1c.

TABLE-1c

| S. No. | Step | Reagent/Instrument used | pH | Temperature (° C.) | Time (Minutes) |
|---|---|---|---|---|---|
| 1. | Fermentation [Agitation 100 RPM & 0.2 vvm aeration] | SS Fermenter 20L working | 7.1 | 36.5 | 360 |
| 2. | Cell Lysis (DOC) | In SS Fermenter (From 12% stock 520 mL added to get final 2.5% DOC conc.) | 6.3 | 15 | 840 |
| 3. | Cell free supernatant | Batch mode cent. (15000 RCF, 45 minutes, 15° C.) | | 15 | 45 |
| 4. | Diafiltration (DF) & concentration | 100 kDa TFF | 6.7 | RT | 180 |
| 5. | TFA treatment [PS sizing initiate & impurities precipitated] | Conc. TFA (final conc. 3.24M) (In 100 mL reaction mixture 25 mL conc. TFA + 75 mL crude PS) | 0.2 | 30 | 60 |
| 6. | Centrifugation [To remove the precipitate] | Batch mode cent. (12000 RCF, 30 min., 12 deg. C.) | | 12 | 30 |
| 7. | Incubation [OR incubation continued till the desired molecular weight was reached] | In water bath | | 30 | 300 |
| 8. | Termination of reaction [pH adjustment before DF & concentration] | Di sodium hydrogen phosphate (solid added as per Q.R.) (For 100 mL reaction mixture 55 g added, which is equal to 3.8M) | 5.8 | RT | 20 |
| 9. | Diafiltration & concentration [DF continued till the condition of permeates is equal to WFI conductivity] | 10 kDa TFF | | RT | 300 |

TABLE-1c-continued

| S. No. | Step | Reagent/Instrument used | pH | Temperature (° C.) | Time (Minutes) |
|---|---|---|---|---|---|
| 10. | Final filtration | 0.2 micron filter | 6.6 | RT | 15 (Depends on the batch size) |

Abbreviations:
RT—room temperature,
DOC—Deoxycholic acid,
DF—diafiltration,
TFF—tangential flow filtration,
kDa—kilo Dalton,
PS—polysaccharides,
TFA—trifluoroacetic acid,
RCF—Relative Centrifugal Force,
Q.R.—quantity required,
WFI—water for injection Tables (1a, 1b and 1c) provide the process steps and parameters for fermentation of *S. pneumoniae* serotypes 2, 18C and 22F along with the steps for purification and sizing of the polysaccharides using trifluoroacetic acid (TFA).

Example-2: Effect of TFA on Polysaccharide

The polysaccharides obtained in Examples 1a, 1b and 1c were analysed and the result obtained is illustrated in Table-2.

TABLE 2

| Serotype | Mw by SEC-HPLC (kDa) | % Protein | % Nucleic acid | Immuno-reactivity | % Yield | CWPs (from NMR) | Proton NMR | Character-ization |
|---|---|---|---|---|---|---|---|---|
| 2 | 153 | 0.25 | 0.3 | 121% | 87 | 2 mol % | Identity & integrity matched with standard | Methyl pentose 57% (limit ≥38%) |
| 18C | 185 | 1.4 | 0.3 | 322% | 78 | <1.5 mol % | | Methyl pentose 28% (limit ≥14%) |
| 22F | 154 | 0.32 | 0.16 | 157% | 71 | <1.9 mol % | | Methyl pentose 38% (limit ≥25%) |

It is seen from Table-2 that the molecular size (SEC-HPLC) for polysaccharides of *S. pneumoniae* serotypes 2, 18C and 22F obtained by the method of present method is below 200 kDa, the protein content is less than 2%, the nucleic acid content is less than 0.3%, polysaccharide yield is more than 70%, immunoreactivity is more than 100%, and CWPs is not more than 2 mol %. Also the methyl pentose content is within the specified limit.

Different concentrations of antigen were neutralized with antigen specific antibodies and mixture was added to antigen coupled beads. The remaining unneutralized antibody binds to the coupled onto the beads. Antibody bound to beads was detected by anti mouse phycoerythrin conjugate. Quantitation of antigen was inversely proportional to median fluorescence intensity (MFI) generated by the reaction. Higher the antigen contains, lower the MFI and vice versa. WO2013046226A2 is being incorporated with reference to the method used for determining immunoreactivity for the polysaccharides.

NMR analysis of the purified polysaccharides was carried out and the results obtained are illustrated in FIGS. 1-7.

Figure 2:
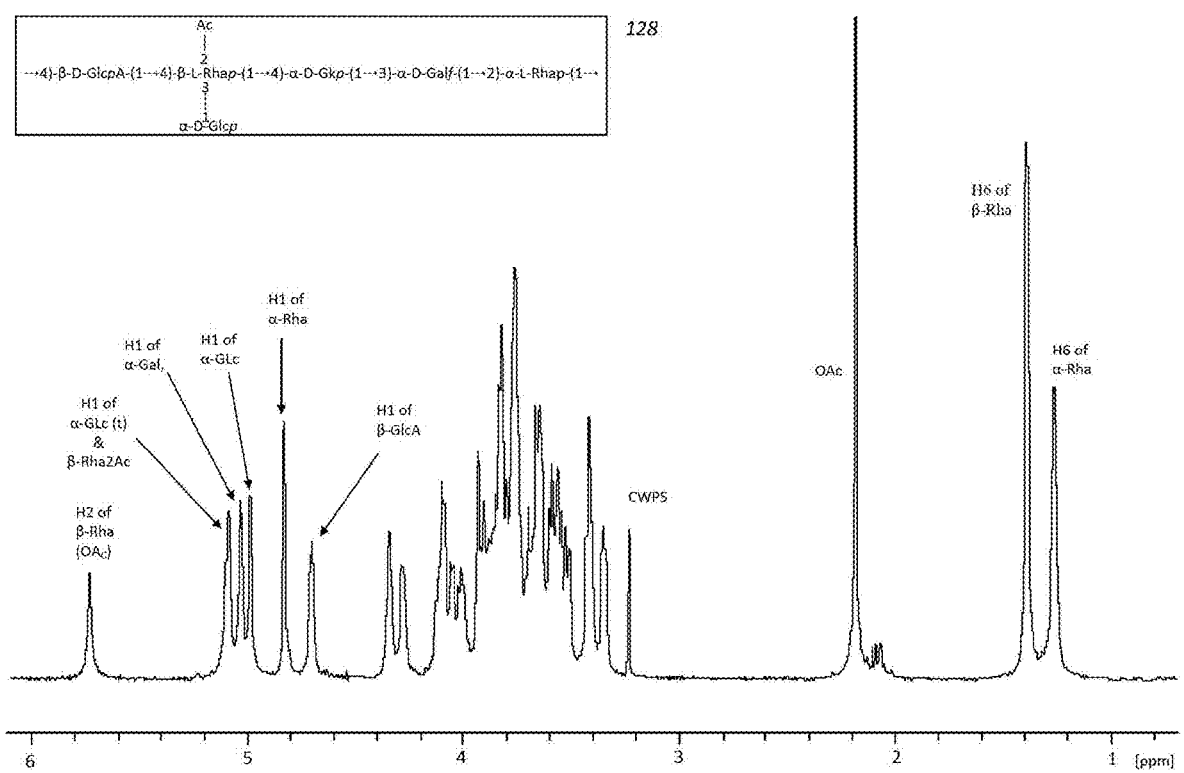
FIG. 2 illustrates the 1H NMR spectrum purified *S. pneumoniae* polysaccharide for serotype 22F obtained by the method of present disclosure.

1D spectrum recorded at 323° K contains a sharp signals from O-acetylated *S. pneumoniae* polysaccharide from serotype 22F RU together with small peaks from CWPs. The O-acetylated 22F RU was identified by key signals in the anomeric (six H1 and H2 of Rha2Ac), acetyl(O-acetyl) and methyl(H6 of a- and B-Rha) regions. This was confirmed by 1H NMR analysis using the peak area of H6 of a- and B-Rha, the mole percent of CWPs were determined as 1.2 mol %. Integration of O-acetyl signal shows the sample has 86% O-acetylation, from the rest of the spectrum it appears to be ~ 100%. The structure of the specific capsular polysaccharide produced by *Streptococcus pneumoniae* type 22F was investigated by $^1$H nuclear magnetic resonance spectroscopy. The polysaccharide was found to be a high molecular weight acidic polymer composed of D-glucose, D-galactose, D-glucuronic acid, and L-rhamnose residues to form a regular repeating hexasaccharide unit having the above structure in which the B-L-rhamnopyranosyl residues were substituted by O-acetyl groups in 80% of the repeating units (FIGS. 1-2).

Figure 3:
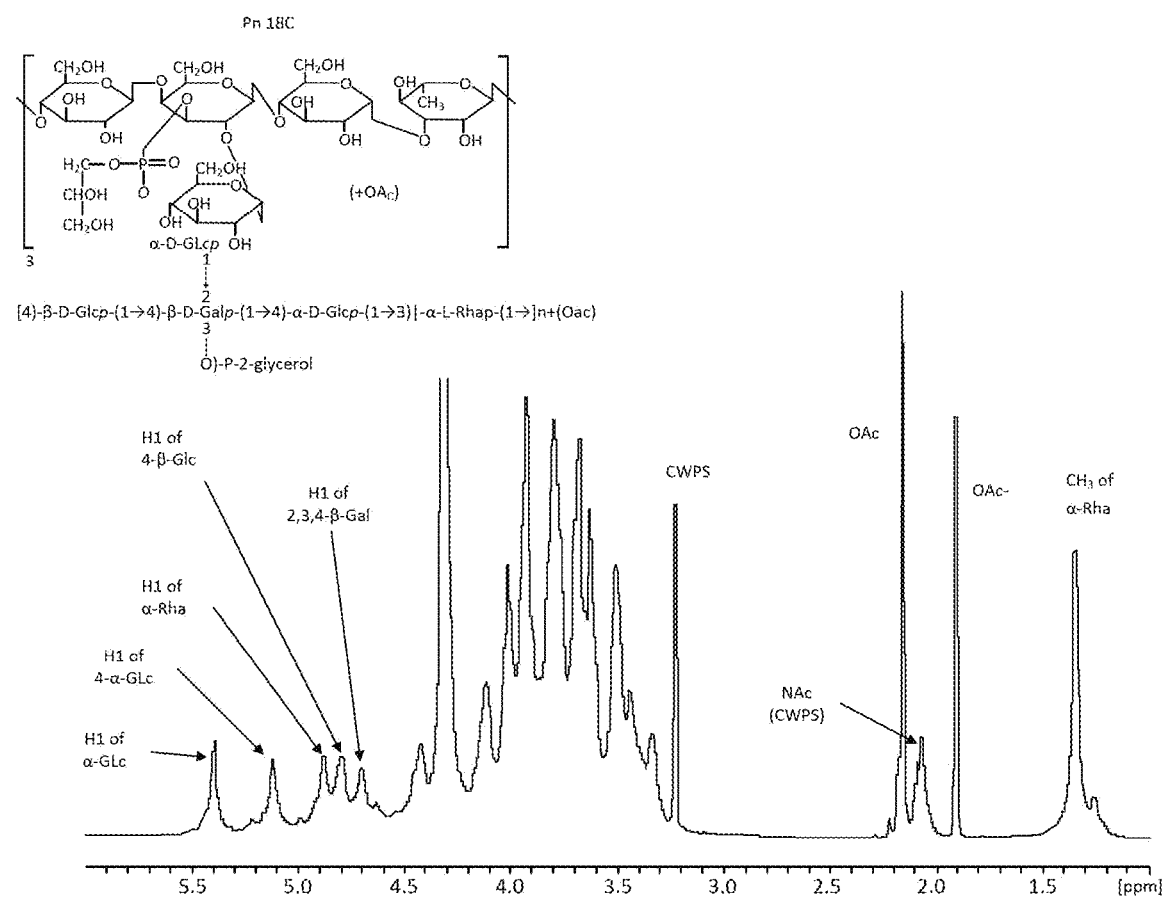
FIG. 3 illustrates the literature spectrum of purified *S. pneumoniae* polysaccharide for serotype 18C.
Figure 4:
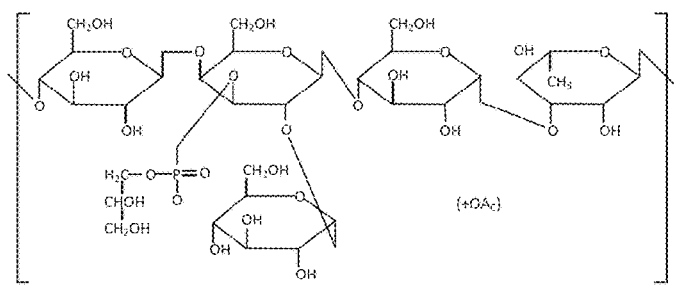
FIG. 4 illustrates the reference 1H NMR spectrum of purified *S. pneumoniae* polysaccharide for serotype 18C.
Figure 4:
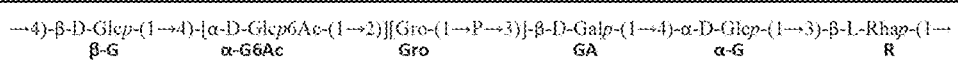
Figure 4:
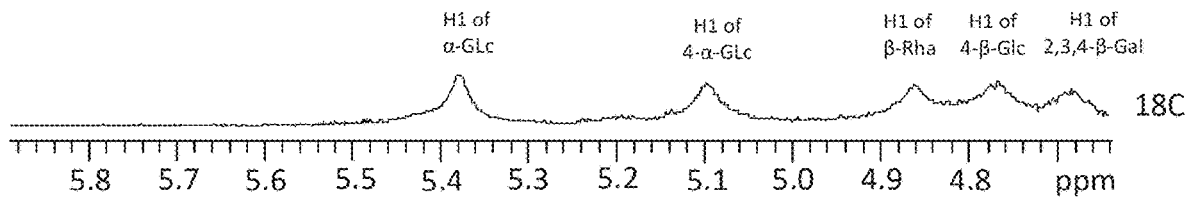
Figure 5:
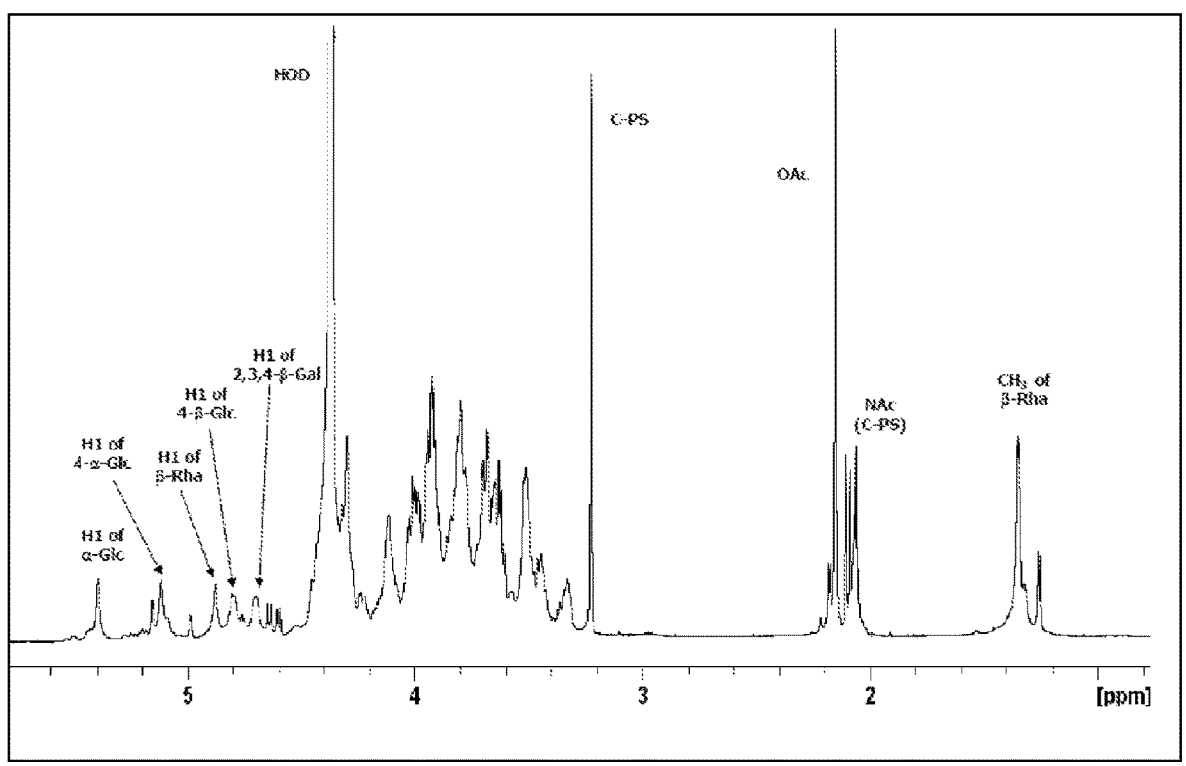
FIG. 5 illustrates the 1H NMR spectrum purified *S. pneumoniae* polysaccharide for serotype 18C obtained by the method of present disclosure.
Figure 6A:
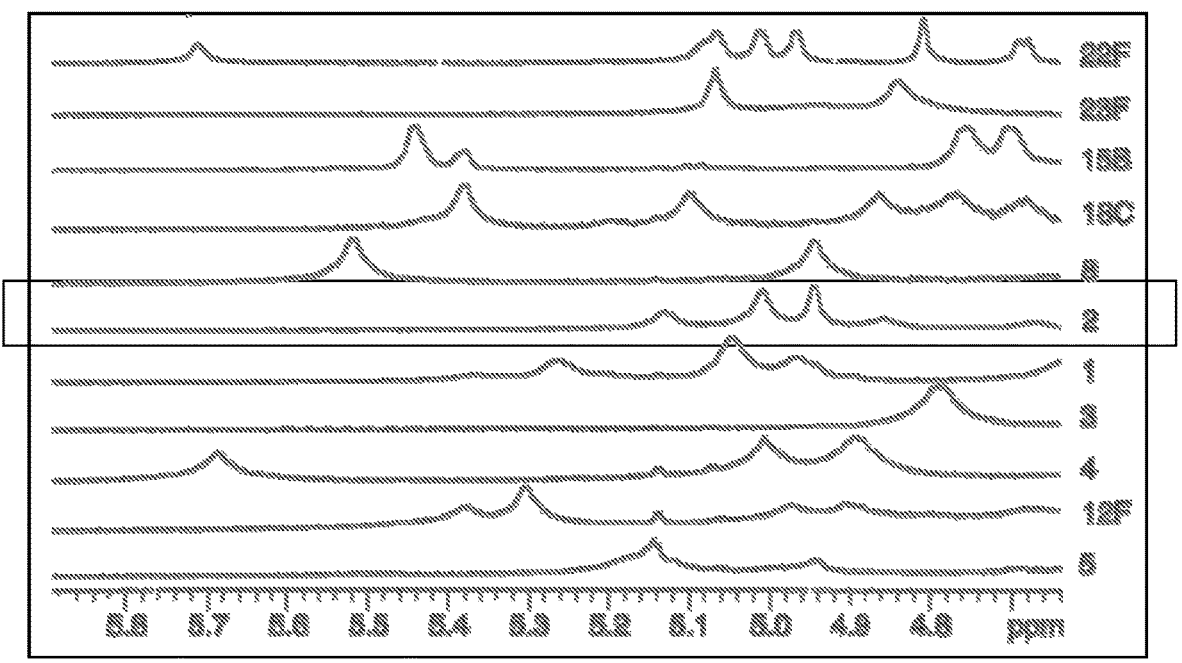
FIG. 6a illustrates the literature 1H NMR spectrum of purified *S. pneumoniae* polysaccharide for serotype 2.
Figure 6B:
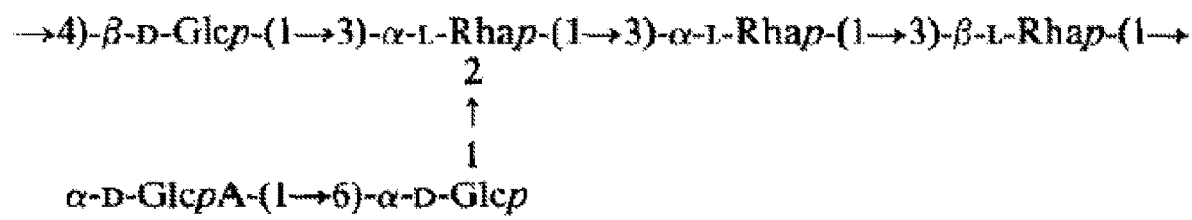
FIG. 6b illustrates the chemical structure of *S. pneumoniae* polysaccharide for serotype 2.
Figure 7:
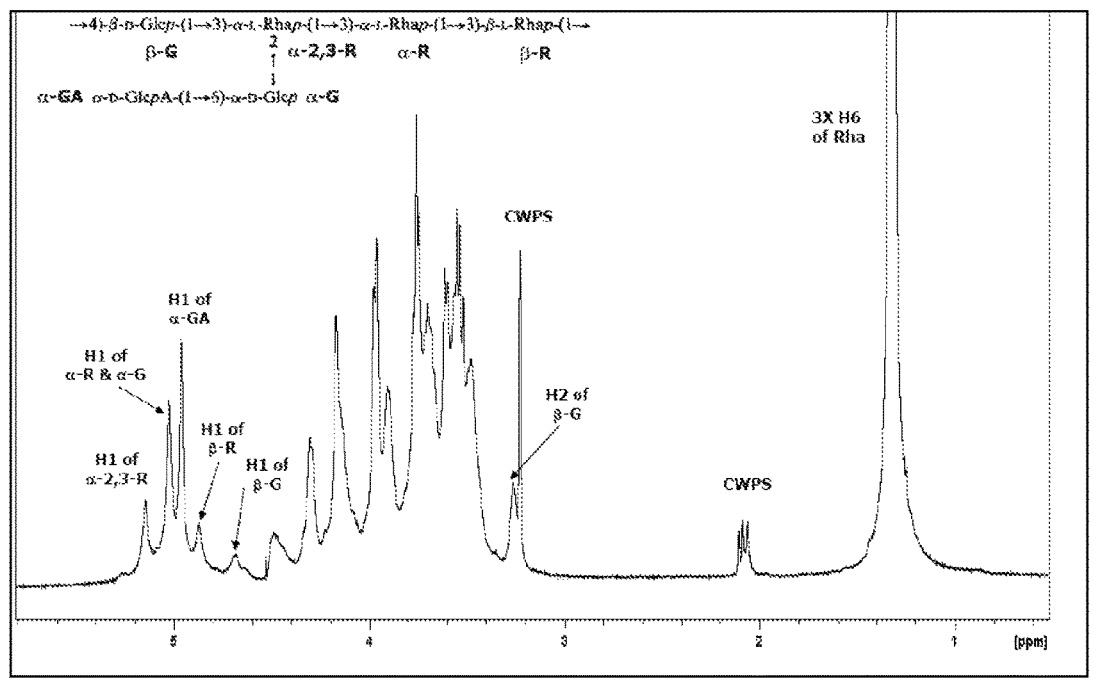
FIG. 7 illustrates the 1H NMR spectrum purified *S. pneumoniae* polysaccharide for serotype 2 obtained by the method of present disclosure.

Pn 18C identity was confirmed by 1 D NMR experiments and literature. P-31 NMR gave major phosphodiester and three CWPs signals which means 2 Cho per CWPs, i.e., 18H for calculation. Low level CWPs was found. By NMR integration of H6 of Rha compared to H2 of Glc, estimate 1.4 mole of methyl pentose per RU. CWPs mole percent is 1.45% from integration of 1H NMR (FIGS. 3-5)

From the literature Pn 2 polysaccharide (FIGS. 6a-6b) consists of a hexasaccharide repeating unit and it gives broad lines due to the rigid RU structure (a doubly-branched sugar) and high viscosity. Some proton literature assignments have been published in Carbohydrate Research, 1988.

NMR spectra recorded at 323° K (Figure-7) showed diagnostic signals from the six H1 signals, H6 signals from Rha (3×) and the presence of low amounts of CWPs. The P-31 spectrum gave 3 signals consistent with the presence of two PCho grows. Integration of the CWPs signal and H6 of Rha gave a CWPs of 2% mole percent. Thus the structure of the RU is consistent with literature, however, full proton and carbon assignments (not available in the literature) will require additional 2D NMR experiments to be performed.

3) Acid resistant/proof equipment(s) shall be considered for scale up the process to the industrial level as the pH of the reaction mixture will be below 1.0. Thereafter all the subsequent operation(s) are carried out at normal pH, hence no special equipment(s) are required.

Example-3: Comparison of Effect of the Method of Present Disclosure and Conventional Process [Homogenization+HIC+IEC] for Serotypes 2, 18C and 22F

TABLE 3

|  |  | TFA with DOC | | | HIC + IEC + Homogenization | | |
| --- | --- | --- | --- | --- | --- | --- | --- |
| S. No. | Experimental data specifications | Serotype 2 | Serotype 18C | Serotype 22F | Serotype 2 | Serotype 18C | Serotype 22F |
| 1) | Polysaccharide Mw by SEC-HPLC (kDa) | 153 | 185 | 154 | 157 | 163 | 145 |
| 2) | Polysaccharide polydispersity | 1.4 | 1.5 | 1.4 | 1.8 | 1.92 | 1.9 |
| 3) | Polysaccharide % yield/recovery | 87 | 78 | 71 | 66 | 70 | 68 |
| 4) | % protein impurity | 0.1 | 0.2 | 0.1 | 0.25 | 1.4 | 0.32 |
| 5) | % nucleic acid impurity | ND | 0.1 | ND | 0.3 | 0.1 | 0.16 |
| 6) | CWPs impurity content (by NMR) | 2 mol % | <1.5 mol % | <1.9 mol % | >6 mol % | >6 mol % | >6 mol % |
| 7) | Conjugate stability | Stable | Stable | Stable | Stable | Stable | Stable |
| 8) | Conjugate immunogenicity | Passes | Passes | Passes | Passes | Passes | Passes |
| 9) | Free Ps (%) | 2.55 | 15.32 | <1 | 4.84 | 17.11 | 3.81 |
| 10) | Free protein (%) | <2 | <2 | ND | <4 | <5 | <1 |

ND = Not detected

Similar results were obtained when purified and sized polysaccharides were obtained in the absence of lytic agent (DOC).

The method of the present disclosure is capable of simultaneous purification and sizing of polysaccharides. It was observed that the impurities including protein, nucleic acid, CWPs are removed during the treatment with the acid. Sizing/depolymerization of the polysaccharide is also initiated at this time. The resulting mixture containing cell debris and impurities was centrifuged to separate the impurities. The supernatant was then further incubated to obtain polysaccharide having the desired molecular size. However, there was no further addition of TFA at this stage; rather the TFA present in the supernatant was capable of sizing/depolymerizing the polysaccharides to the desired molecular size. The residual TFA was removed from the final polysaccharide during the subsequent diafiltration step.

Residual TFA was analysed by high performance anion-exchange chromatography with pulsed amperometric detection (HPAE-PAD) method. It was observed that in the final purified polysaccharide the concentration of residual TFA in per mL sample is ≤2 ppb, which illustrates that the TFA was removed from product (polysaccharide) during the diafiltration step.

Following precautions/process are to be taken while handling TFA:
1) Person shall wear all safety kit, such as acid proof hand gloves, goggles, face shield, etc. while performing operation(s) with TFA.
2) Operation(s) with TFA must have performed under the controlled environment such as air flow unit(s), such as hanging fan flow unit/fume hood, etc.

It is seen from Table-3 that the molecular size (SEC-HPLC) for polysaccharides of S. pneumoniae serotypes 2, 18C and 22F obtained by the method of present method is below 200 kDa, the protein content is less than 1%, the nucleic acid content is less than 0.3%, polysaccharide yield is more than 70%, and CWPs is not more than 2%. It is seen from Table-3 that the method of present disclosure is capable of producing polysaccharides with higher yield when compared with conventional methods. Also, the method of present disclosure is results in comparatively lower CPS impurity.

Further, it is seen from Table-3 that the free protein and free polysaccharide content for the conjugates prepared using the polysaccharides prepared in accordance with the method of present disclosure is within the specified limits and hence the conjugates are stable.

Similar results were obtained when purified and sized polysaccharides were obtained in the absence of lytic agent (DOC).

U.S. Pat. No. 10,729,780 is being incorporated with reference to the polysaccharide protein conjugation processes and multivalent S. pneumoniae conjugate formulations (10 valent, 17 valent) obtained thereof.

The method of present disclosure for simultaneous purification and sizing/depolymerization of polysaccharide by TFA provides numerous advantages over the conventional process. The method of present disclosure is devoid of processes, such as benzonase treatment, ammonium sulphate precipitation, HIC, IEC and homogenization, thereby making the present method rapid, less labor intensive, cost effective, and reduces the loss of yield during the downstream processing. The polysaccharides obtained by the method of the present disclosure, and the conjugates prepared therefrom meets the specifications as per monographs IP/BP/USP/WHO and are stable over extended periods of time.

Technical Advantages

The method for obtaining purified and sized bacterial polysaccharides of the present disclosure described herein above has several technical advantages including, but not limited to, the realization of:

A single step method for purification of bacterial polysaccharides with high recovery, low impurity content Optimal preservation of integrity of polysaccharide (in terms of methyl pentose, acetate and glycerol content) thereby ensuring stable and immunogenic conjugates;

Avoiding a separate step for mechanical sizing of polysaccharides;

Reduction in process time for purification of crude polysaccharides by about 60%;

Simultaneous removal of impurities as well as sizing of bacterial polysaccharides; and Simple and cost effective method for purification of bacterial polysaccharides that does not utilize phenol, TRITON™, enzymes, CTAB, activated carbon, chromatography, ammonium sulphate or ethanol.

The foregoing description of the specific embodiments fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein has been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired object or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values ten percent higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A method for obtaining purified *Streptococcus pneumoniae* polysaccharides, comprising:

a fermentation harvest comprising *Streptococcus pneumoniae* polysaccharides, proteins, nucleic acids and cell debris, wherein pH of the fermentation harvest ranges from 5.8 to 6.8;

subjecting the fermentation harvest to centrifugation to separate cell free supernatant;

filtering the cell free supernatant to obtain a concentrated cell free supernatant;

treating the concentrated cell free supernatant with trifluoroacetic acid having a concentration in the range of 2 M to 5 M, at 20° C. to 60° C. and at a pH in the range of 0.1 to 1, to obtain an acid treated mixture, wherein the *Streptococcus pneumoniae* polysaccharides are separated from the proteins, nucleic acids and cell debris;

subjecting the acid treated mixture to centrifugation to remove precipitated impurities and collecting the supernatant, wherein the precipitated impurities comprise proteins, nucleic acids and cell debris;

incubating the supernatant after removal of the precipitated impurities at a temperature in the range of 20° C. to 50° C. for a time period in the range of 4 hours to 24 hours;

adjusting the pH of the collected supernatant after removal of the precipitated impurities to be in the range of 5.5 to 6.5 with a pH adjusting agent selected from disodium hydrogen phosphate, dipotassium hydrogen phosphate or combinations thereof;

diafiltering to increase a concentration of the *Streptococcus pneumoniae* polysaccharides in a solution to obtain concentrated *Streptococcus pneumoniae* polysaccharides; and filtering the concentrated *Streptococcus pneumoniae* polysaccharides to obtain purified *Streptococcus pneumoniae* polysaccharides, wherein the purified *Streptococcus pneumoniae* polysaccharides have protein content less than 3%, nucleic acid content less than 2%, cell wall polysaccharides (CWPs) content not more than 2 mol %, polydispersity less than 2, molecular size in the range of 10 kDa to 200 kDa (SEC-HPLC), and >10% methyl pentose content.

2. The method of claim 1, wherein the purified *Streptococcus pneumoniae* polysaccharides have at least 60% recovery.

3. The method of claim 1, wherein the *Streptococcus pneumoniae* polysaccharides is selected from the group of *Streptococcus pneumoniae* serotypes consisting of 1, 2, 3, 4, 5, 6A, 6B, 6C, 6D, 6E, 6G, 6H, 7A, 7B, 7C, 7F, 8, 9A, 9L, 9F, 9N, 9V, 10F, 10B, 10C, 10A, 11A, 11F, 11B, 11C, 11D, 11E, 12A, 12B, 12F, 13, 14, 15A, 15C, 15B, 15F, 16A, 16F, 17A, 17F, 18C, 18F, 18A, 18B, 19A, 19B, 19C, 19F, 20, 20A, 20B, 21, 22A, 22F, 23A, 23B, 23F, 24A, 24B, 24F, 25F, 25A, 27, 28F, 28A, 29, 31, 32A, 32F, 33A, 33C, 33D, 33E, 33F, 33B, 34, 45, 38, 35A, 35B, 35C, 35F, 36, 37, 38, 39, 40, 41F, 41A, 42, 43, 44, 45, 46, 47F, 47A, and 48.

4. The method of claim 3, wherein the *Streptococcus pneumoniae* serotypes are selected from the group consisting of 2, 18C, 22F, 5 and 12F.

5. The method of claim 1, wherein the pH of the trifluoroacetic acid ranges from 0.1 to less than 1.0.

6. The method of claim 5, wherein the pH of the trifluoroacetic acid ranges from 0.1 to less than 0.5.

7. The method of claim 1, wherein the fermentation harvest is treated with the trifluoroacetic acid for a time period in the range of 1 hour to 10 hours.

8. The method of claim 1, wherein the g of the cell free supernatant is carried out on a 100 kDa tangential flow filtration (TFF) membrane at a pH in the range of 5.5 to 8 and the diafiltration is carried out on a 10 kDa tangential flow filtration (TFF) membrane at a pH in the range of 4 to 6.

9. The method of claim 1, wherein the x-filtering of the concentrated *Streptococcus pneumoniae* polysaccharides is carried out using a 0.2 µ filter at a pH in the range of 6 to 7.

10. The method of claim 1, wherein the fermentation harvest is treated with a lytic agent prior to treatment with the trifluoroacetic acid.

11. The method of claim 10, wherein the lytic agent is selected from mechanical or non-mechanical lytic agents.

12. The method of claim 11, wherein the mechanical lytic agent is selected from sonication, high pressure homogenization or bead mill.

13. The method of claim 11, wherein the non-mechanical lytic agent is a chemical lytic agent selected from acids, alkali or detergents.

14. The method of claim 13, wherein the chemical lytic agent is selected from the group consisting of deoxycholate sodium (DOC), sodium dodecyl sulphate (SDS), 2-[4-(2,4,4-trimethylpentan-2-yl) phenoxy] ethanol, Polyoxyethylene (20) sorbitan monolaurate, Polyoxyethylene (80) sorbitan monooleate, ethylenediaminetetraacetic acid (EDTA), urea, cetyltrimethylammonium bromide (CTAB) decanesulfonic acid, tert-octylphenoxy poly(oxy ethylene) ethanols, octylphenol ethylene oxide condensates, N-lauryl sarcosine sodium (NLS), lauryl iminodipropionate, chenodeoxycholate, hyodeoxycholate, glycodeoxycholate, taurodeoxycholate, taurochenodeoxycholate, and cholate.

15. The method of claim 11, wherein the non-mechanical lytic agent is a physical lytic agent selected from thermal lysis, cavitation or osmotic shock.

16. The method of claim 11, wherein the non-mechanical lytic agent is an enzyme selected from lysozyme, lysostaphin, zymolase, proteinase K, protease or glycanase.

17. A method for obtaining purified *Streptococcus pneumoniae* polysaccharides, comprising:
a fermentation harvest comprising *Streptococcus pneumoniae* cells, wherein pH of the fermentation harvest ranges from 5.8 to 6.8;
treating the fermentation harvest with a lytic agent to obtain a mixture of *Streptococcus pneumoniae* polysaccharides, proteins, nucleic acids and cell debris, wherein a pH of the ranges from 5 to 7;
subjecting the mixture to centrifugation to separate cell free supernatant;
filtering the cell free supernatant to obtain a concentrated cell free supernatant;
treating the concentrated cell free supernatant with trifluoroacetic acid having a concentration in the range of 2 M to 5 M at 20° C. to 60° C. and a pH in the range of 0.1 to 1, to obtain an acid treated mixture, wherein the *Streptococcus pneumoniae* polysaccharides are separated from the proteins, nucleic acids and cell debris;
subjecting the acid treated mixture to centrifugation to remove precipitated impurities and collecting the supernatant, wherein the precipitated impurities comprise the proteins, nucleic acids and cell debris;
incubating the supernatant after removal of the precipitated impurities at a temperature in the range of 20° C. to 50° C. for a time period in the range of 4 hours to 24 hours;
adjusting the pH of the collected supernatant after removal of the precipitated impurities to be in the range of 5.5 to 6.5 with a pH adjusting agent selected from the group consisting of any one or more of disodium hydrogen phosphate or dipotassium hydrogen phosphate;
diafiltering to increase a concentration of the *Streptococcus pneumoniae* polysaccharides in a solution to obtain concentrated *Streptococcus pneumoniae* polysaccharides; and
filtering the concentrated *Streptococcus pneumoniae* polysaccharides to obtain purified *Streptococcus pneumoniae* polysaccharides, wherein the purified *Streptococcus pneumoniae* polysaccharides have a protein content less than 3%, nucleic acid content less than 2%, CWPs content not more than 2 mol %, polydispersity less than 2, molecular size in the range of 10 kDa to 600 kDa (SEC-HPLC), and >10% methyl pentose content.

18. The method of claim 17, wherein the filtering of the cell free supernatant is carried out on a 100 kDa tangential flow filtration (TFF) membrane at a pH in the range of 5.5 to 8 and the diafiltration is carried out on a 10 kDa tangential flow filtration (TFF) membrane at a pH in the range of 4 to 6.

19. The method of claim 17, wherein the filtering of the concentrated *Streptococcus pneumoniae* polysaccharides is carried out using a 0.2 µ filter.

20. The method of claim 17, wherein the purified *Streptococcus pneumoniae* polysaccharides have at least 60% recovery.

21. The method of claim 1, further comprising at least one chromatography step to obtain the purified polysaccharides, wherein the at least one chromatography step is selected from the group consisting of ion-exchange, affinity chromatography, hydrophilic-interaction, hydrophobic-interaction, size-exclusion, hydroxyl apatite, gel-permeation chromatography, Cibacron Blue pseudo affinity sorbent, mixed mode chromatography sorbent, membrane chromatography, multimodal anion exchanger, methacrylate polymer, crosslinked cellulose, monolith chromatography device, adsorbent chromatography, lectin agarose column, and polymer resins.

22. The method of claim 1, further comprising treatment with one or more chemical/biological reagents at any stage of the method, the one or more chemical/biological reagents selected from the group consisting of cetyl trimethyl ammonium bromide (CTAB), hexadimethrine bromide and myristyltrimethylammonium, 2-[4-(2,4,4-trimethylpentan-2-yl) phenoxy] ethanol, acetate, sodium carbonate, zinc, enzymes, alcohol (Ethanol, Isopropanol), phenol, acetone, salts (magnesium, calcium), sodium dodecyl sulfate (SDS), polysorbates, sodium sarcosine, NaCl, urea, formaldehyde, ammonium chloride, ethylenediaminetetraacetic acid (EDTA), ammonium sulfate, mineral acid, organic acid, metal cations, toluene, chloroform, alkali, ascorbic acid, tetrabutylammonium, potassium chloride, alkyl sulfates, sodium deoxycholate, sodium dodecyl sulfonate, sodium s-alkyl sulfates, sodium fatty alcohol polyoxyethylene ether sulfates, sodium oleyl sulfate, N-oleoyl poly(amino acid) sodium, sodium alkylbenzene sulfonates, sodium α-olefin sulfonates, sodium alkyl sulfonates, a-sulfo monocarboxylic acid esters, fatty acid sulfoalkyl esters, succinate sulfonate, alkyl naphthalene sulfonates, sodium alkane sulfonates, sodium ligninsulfonate, sodium alkyl glyceryl ether sulfonates, DNase, RNase, Benzonase, Mutanolysin/lysozyme, beta.-D-N-acetyl glucosaminidase, and Proteinase K.

23. The method of claim 1, wherein the purified *Streptococcus pneumoniae* polysaccharides are subjected to a size reduction step selected from thermal treatment, sonic treatment, chemical hydrolysis, endolytic enzyme treatment, or physical shear.

\* \* \* \* \*